United States Patent
Martinez Valdegrama et al.

(10) Patent No.: US 8,277,938 B2
(45) Date of Patent: Oct. 2, 2012

(54) PART OF COMPOSITE MATERIAL HAVING A WEDGE BETWEEN TWO ZONES

(75) Inventors: Vicente Martinez Valdegrama, Madrid (ES); Jose Luis Lozano Garcia, Madrid (ES); Jose Orencio Granado Macarrilla, Madrid (ES)

(73) Assignee: Airbus Operations S.L., Madrid (ES)

( * ) Notice: Subject to any disclaimer, the term of this patent is extended or adjusted under 35 U.S.C. 154(b) by 422 days.

(21) Appl. No.: 12/478,251

(22) Filed: Jun. 4, 2009

(65) Prior Publication Data
US 2010/0247903 A1    Sep. 30, 2010

(30) Foreign Application Priority Data
Mar. 31, 2009   (ES) .................................. 200900883

(51) Int. Cl.
| G11B 11/105 | (2006.01) |
| --- | --- |
| B32B 3/00 | (2006.01) |
| B32B 7/08 | (2006.01) |
| B32B 15/06 | (2006.01) |
| B32B 15/08 | (2006.01) |
| B64C 1/00 | (2006.01) |
| B64C 30/00 | (2006.01) |
| B64C 1/10 | (2006.01) |
| B64C 3/00 | (2006.01) |
| B64C 5/00 | (2006.01) |
| B64D 7/00 | (2006.01) |
| B64B 1/02 | (2006.01) |
| B29C 65/00 | (2006.01) |

(52) U.S. Cl. ........ 428/332; 428/156; 428/223; 428/614; 428/615; 244/117 R; 244/121; 244/123.1; 244/125; 244/126; 244/127; 244/131; 244/132; 244/133; 156/60

(58) Field of Classification Search .................. 428/332
See application file for complete search history.

(56) References Cited

U.S. PATENT DOCUMENTS

| 6,180,206 B1* | 1/2001 | Kain, Jr. ........................ 428/116 |
| --- | --- | --- |
| 2005/0089704 A1* | 4/2005 | Rajabali et al. ............... 428/544 |
| 2006/0159886 A1* | 7/2006 | Rajabali et al. ............... 428/137 |
| 2006/0188696 A1* | 8/2006 | Grose et al. ................... 428/156 |
| 2008/0138584 A1* | 6/2008 | Grose et al. ................... 428/156 |
| 2008/0258008 A1* | 10/2008 | Cooper ......................... 244/131 |
| 2010/0308170 A1* | 12/2010 | Hadley et al. ................. 244/131 |

OTHER PUBLICATIONS

U.S. Appl. No. 13/318,531, filed Nov. 2, 2011, Lozano Garcia, et al.

* cited by examiner

Primary Examiner — David Sample
Assistant Examiner — Nathan Van Sell
(74) Attorney, Agent, or Firm — Oblon, Spivak, McClelland, Maier & Neustadt, L.L.P.

(57) ABSTRACT

A part of composite material having a wedge between two zones, the second zone being shorter than the first zone, whose structure includes from its outer surface to its inner surface: a first section formed from at least two continuous sheets extending parallel to its outer surface, the gradient of the wedge being between 20% and 50%; a wedge in the shape of a triangular prism with its larger surface dimensioned in such a way that it forms a wedge having a gradient of less than 20%; a second section formed by a plurality of continuous sheets extending parallel to the surface bounded by the first section with the wedge placed upon it. The invention also relates to a process for manufacture of the part.

7 Claims, 4 Drawing Sheets

PART OF COMPOSITE MATERIAL HAVING A WEDGE BETWEEN TWO ZONES

FIELD OF THE INVENTION

This invention relates to the structure of the lay-up of a part of composite material having a wedge between two zones which is manufactured by curing the said lay-up in an autoclave, and more particularly the structure of the lay-up of a part of composite material for an aircraft structure.

BACKGROUND TO THE INVENTION

Processes for the manufacture of parts which basically comprise a first stage of laying-up sheets by means of ATL "Automatic Tape Lay-Up" and a second stage of curing in an autoclave are well-known in the aviation industry.

During the lay-up stage layers of composite material such as a prepreg, which is a storable mixture of fibre reinforcement and polymer matrix, are placed in a mould/tool of suitable shape.

This material may be in various forms and in particular in the form of a sheet. In the case of thermo-hardening matrices the resin is generally partly cured or brought to a controlled viscosity, known as the B-stage, by another process.

Sheets of composite material are not located randomly but are positioned in each zone in a number and having an orientation of their fibre reinforcement, typically carbon fibre, which are determined according to the nature and magnitude of the forces which the part must withstand in each zone. ATL ("Automatic Tape Lay-Up") machines are generally used for this.

Automatic tape lay-up machines are very efficient for manufacturing flat or substantially flat lay-ups given that the permissible gradients for such machines are small.

Nevertheless there are aircraft structures which include wedges which, although it would be desirable from the design point of view that they should have gradients greater than those permissible for ATL machines, are finally designed with smaller gradients in order to comply with the manufacturing constraints of these machines. This gives rise to various disadvantages which this invention is intended to overcome.

SUMMARY OF THE INVENTION

One object of this invention is to provide a lay-up structure of a part made of composite material whose configuration includes a wedge between two zones and which can be manufactured using an ATL machine even though the gradient of the wedge is greater than that required for the use of this type of machine.

Another object of this invention is to provide a lay-up structure for a part made of composite material whose configuration includes a wedge between two zones which makes manufacture using an ATL machine easier without changes in the configuration of the wedge which involve increases in weight.

Another object of this invention is to provide a lay-up structure for a part made of composite material whose configuration includes a wedge between two zones which makes it easier to manufacture using an ATL machine without changes in the configuration of the wedge providing connection between the part and additional elements.

In a first aspect of these and other objects are accomplished by means of a part manufactured from a lay-up of layers of composite material which includes a wedge between a first zone and a second zone, generally of shorter length than the first zone, whose structure comprises from its outside surface to its inside surface:

- a first section formed from at least two continuous sheets extending parallel to the outer surface of the part where the gradient of the outer surface of the wedge is between 20% and 50%.
- a wedge in the shape of a triangular prism placed on the said first section and with its largest surface dimensioned in such a way that it forms a wedge having a gradient of less than 20% ending at the start of the said second zone,
- a second section formed of a plurality of continuous sheets extending parallel to the surface bounded by the said first section with the said wedge placed upon it.

In a preferred embodiment of this invention the gradient of the outer surface of the wedge is between 20% and 35% and the gradient of the largest surface of the wedge is less than 15%. By this means a lay-up structure which can be used for most parts of composite material for aircraft structures designed with wedges can be achieved.

In a preferred embodiment of this invention the gradient of the outer surface of the wedge is between 20% and 35% and the gradient of the largest surface of the wedge is less than 15%. By this means a lay-up structure which can be used for most parts of composite material designed with wedges can be achieved.

In another preferred embodiment of this invention, the said wedge is made of a composite material which is cured in the same cycle as the part. Manufacture is facilitated by this means.

In a second aspect there is provided a process for manufacture of the part mentioned which comprises laying up sheets of composite material on a lay-up tool having the shape of the outer surface of the part and curing in an appropriate device through which:

in a first stage the sheets of the first section are laid-up using an ATL machine and compacted manually,
in a second stage the wedge is positioned,
in a third stage the sheets of the second section are laid-up and compacted using an ATL machine.

Other features and advantages of this invention will be apparent from the following detailed description of an illustrative embodiment of the object of the invention in relation to the appended figures.

DETAILED DESCRIPTION OF THE INVENTION

Figure 1:
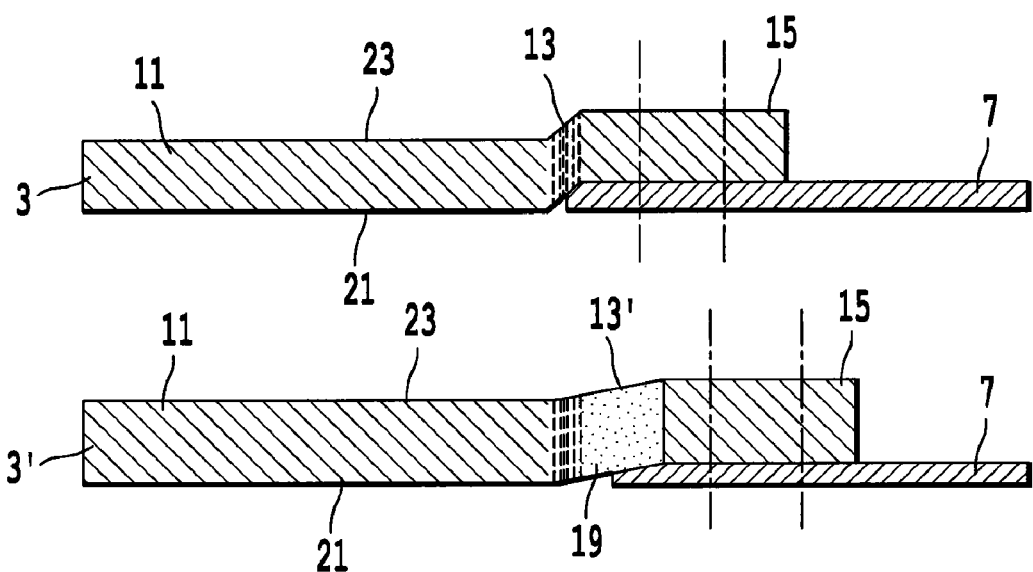
FIG. 1 is a diagrammatical view in cross-section of a part of composite material having a wedge between two zones, the upper part of which illustrates the structure which is desirable from the design point of view and the lower part of which illustrates the structure used to adapt to the constraints required by the use of an ATL machine during the stage of laying-up the part.
Figure 2:
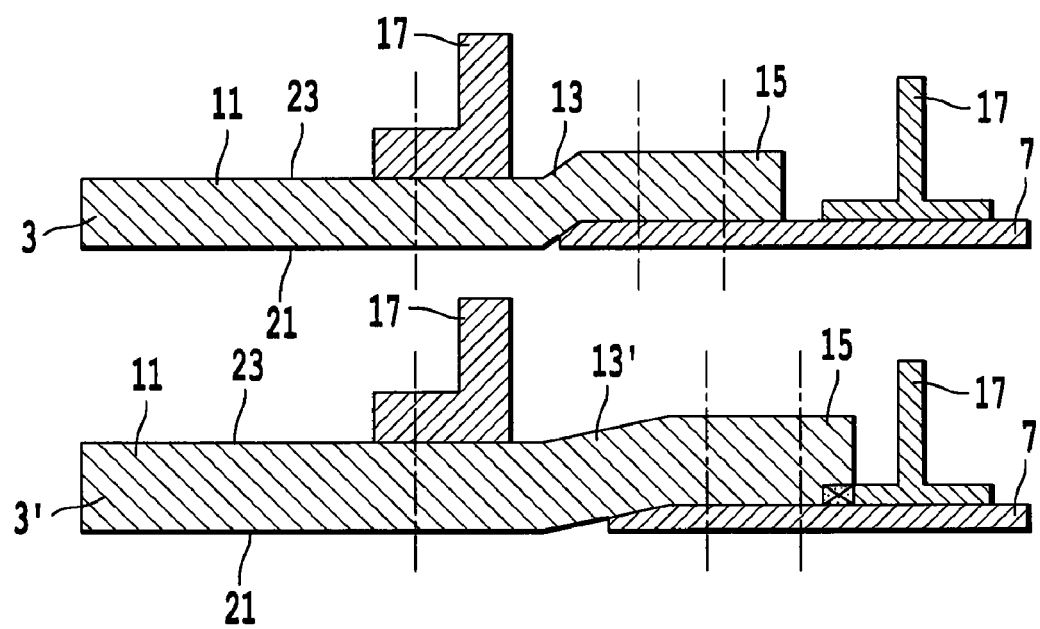
FIG. 2 is a diagrammatical view in cross-section of the same part in FIG. 1 with some stiffening elements to illustrate one of the problems arising in the known art with parts incorporating wedges.

This invention relates to parts manufactured from composite material having a wedge like the parts 3, 3' illustrated in FIGS. 1 and 2 having a wedge 13 between two zones 11, 15. These figures also show a part 7, of smaller thickness than parts 3, 3', which has to be joined to them in zone 15, with its outer surface in line with that of zone 11.

Figure 3A:
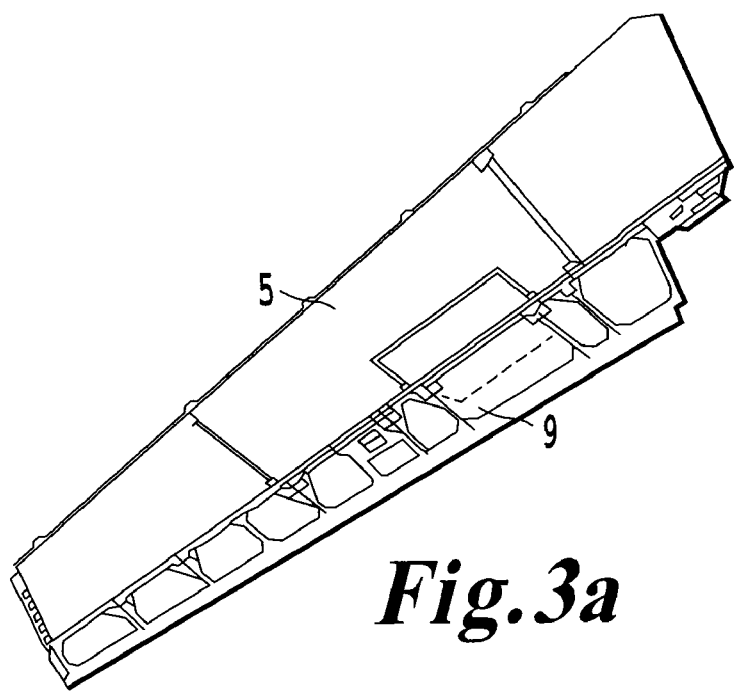
FIG. 3a is a view of a horizontal tailplane of an aircraft with a torsion box in which the lining is a part having a wedge between two zones and FIG. 3b is a partial detailed view of an area of attachment of a component of the trailing edge.
Figure 3B:
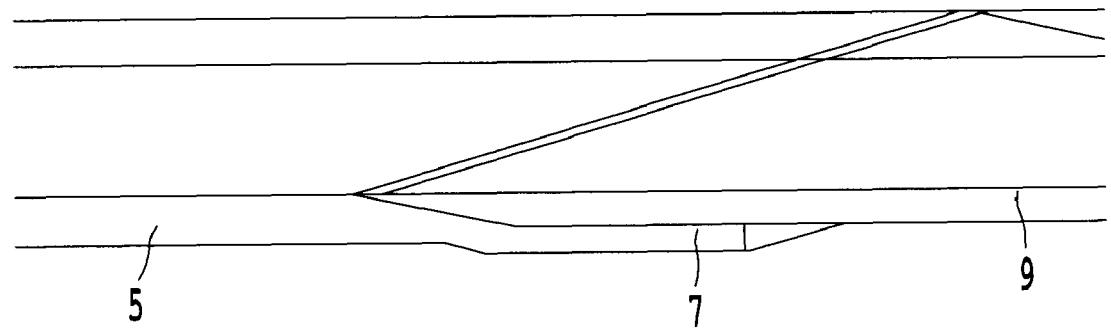

As an example of parts of this type in the aviation industry, mention may be made of the linings of the torsion boxes of tailplanes illustrated in FIGS. 3a and 3b in which zone 11 in parts 3, 3' corresponds to the lining 5 of the box proper and zone 15 corresponds to the connecting edge 7 of components 9 of the leading edge and trailing edge which in turn correspond to part 7. Wedges 13, 13' are determined by the difference in thickness between part 7 and parts 3, 3' so that the outer surface of zone 11 of parts 3, 3' and the outer surface of part 7 have appropriate aerodynamic continuity.

Parts 3 and 3' in FIGS. 1 and 2 show the structure which is desirable from the design point of view and the structure which can be manufactured using the known art respectively.

In the situation illustrated in FIG. 1 it will be seen that one problem arising from part 3', whose structure includes a portion 13' which is more gently wedged than wedge 13 in part 3, which has a greater gradient, is the increase in weight corresponding to shaded area 19.

In the situation illustrated in FIG. 2 it will be seen that the problem arising as a result of part 3', whose structure includes a wedge 13' having a gentler gradient than wedge 13 of part 3, which has a larger gradient, is the problem that the location of the final part of zone 15 is in conflict with T-shaped stiffening member 17 attached to part 7, apart from the same problem of increased weight as in the previous situation, and the problem that the extension of the wedge towards zone 15 of part 3' makes it difficult to fit machined panels or covers to its inner surface, as it is difficult to do this on inclined surfaces.

It follows from the above that it would be desirable to be able to manufacture parts of composite material having wedges which have a gradient greater than that required for an ATL machine on their outer surfaces in order to avoid the abovementioned disadvantages.

Figure 4:
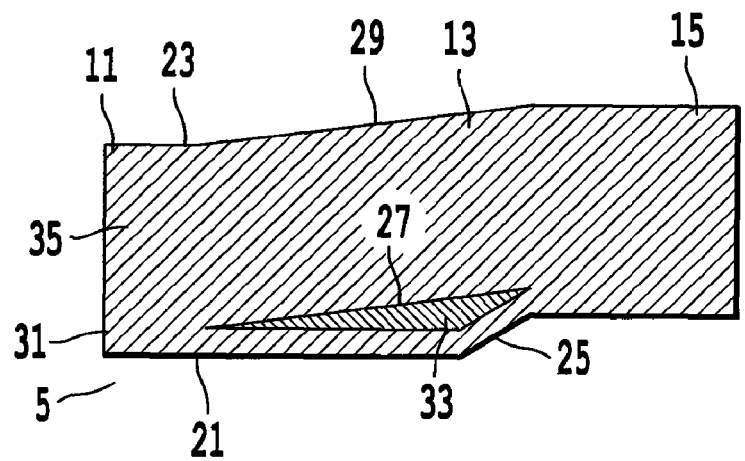
FIG. 4 is a diagrammatical view in transverse cross-section of the structure of a part having a wedge between two zones according to this invention.

According to this invention this is overcome through a part 5 having a wedge 13 between two zones 11, 15 in which the gradient of outer surface 25 of the wedge is between 20% and 50%, depending upon the design requirements, and whose structure comprises, as shown in FIG. 4:

a first section 31 formed of a reduced number of sheets extending parallel to outer surface 21 of part 5, a wedge 33 in the shape of a triangular prism placed on the said first section 31 whose largest surface 27 forms a wedge having a gradient of less than 20% and ends at the start of the second zone 15 of part 5, a second section 35 formed of a plurality of continuous sheets extending parallel to the surface bounded by the said first section 31 with the said wedge 33 placed upon it.

As may be seen in FIG. 4, the two smaller surfaces of wedge 33 bound a broken surface parallel to that of outer surface 21 of part 5 and its larger surface 27 has a gradient compatible with the requirements of the lay-up machine in order that it should operate correctly. Thus its function is to convert the very inclined gradient of surface 25 of the wedge into the gentler gradient of the surface 27 of wedge 33 in order to assist laying-up of the sheets for second section 35 using an ATL machine. In addition to this it will be seen that inner surface 23 of part 5 is an optimal surface for the fitting of members which must be supported upon it.

Preferably wedge 33 is made using a roving of carbon fibre which is cured in the same cycle as the part. In other embodiments wedge 33 may be made of materials such as for example glass fibre.

In another preferred embodiment of this invention the gradient of outer surface 25 of the wedge is between 20% and 35% and the gradient of the largest surface of wedge 33 is less than 15%.

Figure 5A:
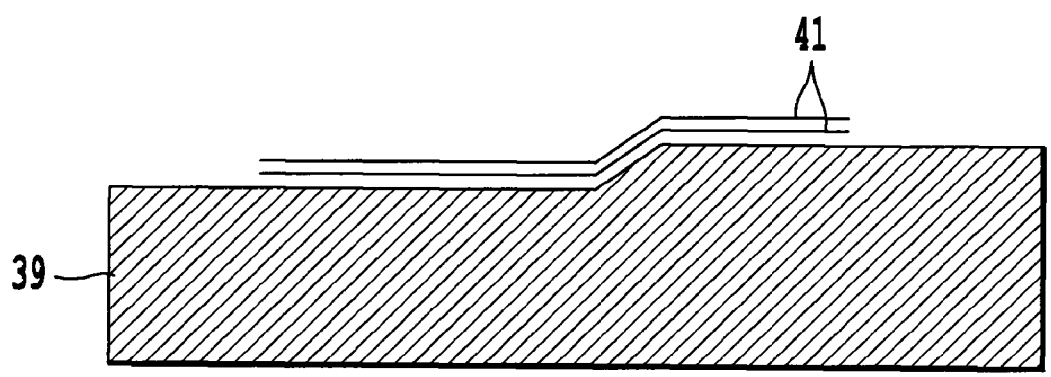
FIGS. 5a, 5b and 5c are diagrammatical views of the process of laying-up a part having a wedge between two zones according to this invention.
Figure 5B:
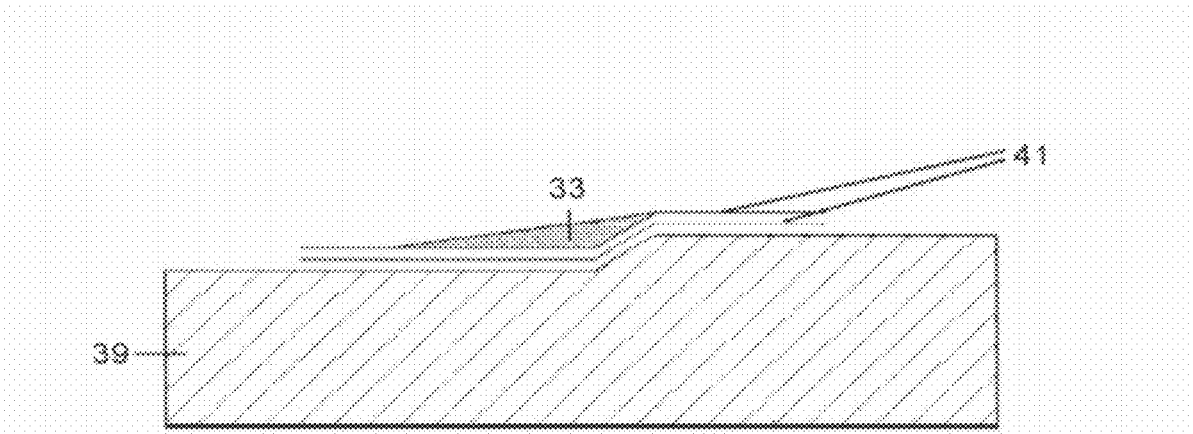
Figure 5C:
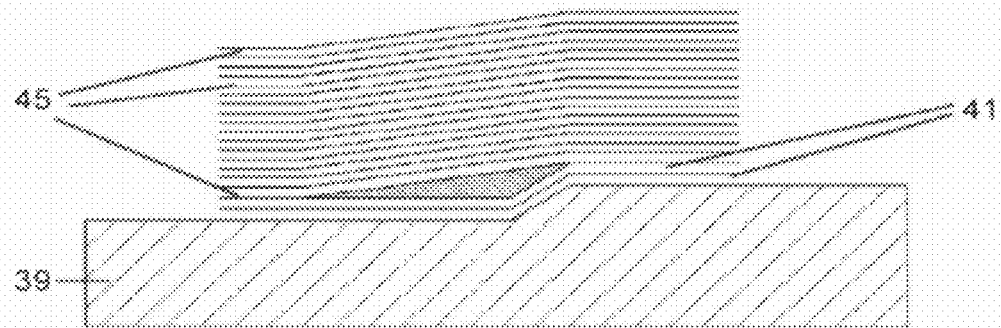

By following FIGS. 5a, 5b, 5c, the three basic stages which follow each other in the laying-up of part 5 will be seen:

in the first stage sheets 41 of section 31 which follow the external geometry of part 5 and lay-up wedge 39 are laid up. The sheets may be laid-up using an ATL machine, but must be compacted manually because the machine cannot do this correctly, given the gradient of the wedge, in the second stage wedge 33 is fitted. The location of wedge 33 on the inside of part 5 avoids problems of surface finish and cracking which would occur if it was located on the outside of part 5, in the third stage the sheets 45 of section 35 are laid-up using an ATL machine in the normal way.

Those modifications which are included within the scope defined by the following claims may be introduced into the preferred embodiments which have just been described.

The invention claimed is:

1. A part manufactured by laying-up of sheets of composite material which includes a wedge between a first zone and a second zone wherein the part's structure includes from its outer surface to its inner surface:

a first section formed of at least two continuous sheets extending parallel to the outer surface of the part, the outer surface of the wedge includes an angled surface with a gradient between 20% and 50% with respect to the horizontal axis, a triangular prism, having a wedge shape, located on top of the first section, a largest surface of the triangular prism dimensioned in such a way that it forms a wedge having a gradient of less than 20% with respect to the horizontal axis, and which ends at the start of the second zone, and a smallest surface of the triangular prism is parallel to the angled surface of the wedge, and a second section formed by a plurality of continuous sheets extending parallel to a surface bounded by the first section and the wedge located on top of the first section.

2. The part according to claim 1, wherein the gradient of the outer surface of the wedge is between 20% and 35% and the gradient of the largest surface of the triangular prism is less than 15%.

3. The part according to either of claims 1-2, wherein the wedge is made of a composite material which is cured in the same cycle as the part.

4. The part according to claim 1, wherein the part forms part of a lining of a torsion box of an aircraft tailplane.

5. The part according to claim 1, wherein the wedge is made of glass fiber.

6. The part according to claim 1, wherein a middle length surface of the triangular prism, which is the surface other than the smallest and largest surface, is parallel to the outer surface of the wedge.

7. A process for the manufacture of the part according to claim 1, comprising:

laying-up the sheets of composite material on a lay-up tool having the shape of the outer surface of the part and curing the sheets in a suitable device, wherein:

in a first step, laying up the sheets of the first section using an ATL machine, and manually compacting the sheets, in a second step, fitting the triangular prism, and in a third step, laying-up the sheets of the second section and compacting the sheets using an ATL machine.

* * * * *